UNITED STATES PATENT OFFICE.

MAX AMS AND VICTOR LITZELMANN, OF NEW YORK, N. Y.

PROCESS OF EXTRACTING GLYCERINE FROM FATTY MATTER.

SPECIFICATION forming part of Letters Patent No. 272,510, dated February 20, 1883.

Application filed January 3, 1883. (No specimens.)

*To all whom it may concern:*

Be it known that we, MAX AMS and VICTOR LITZELMANN, both of the city of New York, county and State of New York, have invented a new and Improved Process of Extracting Glycerine from Fatty Matter, of which the following specification is a full, clear, and exact description.

This invention relates to a new process for extracting glycerine from fatty matter, and is a modification of the process described in Patent No. 267,753, granted to V. Litzelmann, November, 21, 1882. In that patent oxide of zinc is used to separate the glycerine from the fat. We have found that in place of using oxide of zinc a tin preparation—such as oxide of tin—produces superior results, being more effective in its operation and necessitating the use of a smaller amount of the metal.

The invention consists in adding to the fatty matter water and oxide of tin, also in the addition of chloride of lime, all as hereinafter more fully pointed out.

In carrying our invention into effect we proceed in the manner, as described, in the above named patent—that is to say, we place in an autoclave about six thousand pounds of fatty matter, and add thereto fourteen hundred pounds of water. With this water is previously mixed about eight pounds of oxide of tin. It is also preferable to add about five pounds of chloride of lime, which acts as a strong bleaching agent for the fatty residue. Steam under pressure is introduced into the autoclave for about four hours, and the resultant mass is then discharged into a tank, when the saponified fat will settle on the surface. The water containing the glycerine is drawn off at the bottom, and the water evaporated until the glycerine remains over all, as described in the patent above referred to.

For the purposes of this invention oxide of manganese may be used in place of the oxide of tin, and is an equivalent of the same.

Pure tin or any other tin preparation may also be used in place of the oxide of tin; but the latter we prefer as producing the best results.

We claim as our invention—

1. The process of extracting glycerine from fatty matter, which consists in adding to said fatty matter water and oxide of tin, substantially as specified.

2. In the process of extracting glycerine from fatty matter by the use of oxide of tin, the addition of chloride of lime, substantially as and for the purpose specified.

MAX AMS.
VICTOR LITZELMANN.

Witnesses:
JOS. J. MCGINLEY,
F. V. BRIESEN.